United States Patent [19]

Abe et al.

[11] 4,418,303

[45] Nov. 29, 1983

[54] DC MOTOR CONTROL CIRCUIT

[75] Inventors: Fumiyoshi Abe, Zama; Takayuki Okafuji, Yokohama, both of Japan

[73] Assignee: Sony Corporation, Tokyo, Japan

[21] Appl. No.: 360,435

[22] Filed: Mar. 22, 1982

[30] Foreign Application Priority Data

Mar. 30, 1981 [JP] Japan ................................. 56-46745

[51] Int. Cl.$^3$ ........................................... H02K 29/02
[52] U.S. Cl. ..................................... 318/254; 318/138
[58] Field of Search .................. 318/254, 254 A, 138, 318/294

[56] References Cited

U.S. PATENT DOCUMENTS 4,358,720 11/1982 Abe ..................................... 318/254

Primary Examiner—J. V. Truhe
Assistant Examiner—Patrick C. Keane
Attorney, Agent, or Firm—Hill, Van Santen, Steadman & Simpson

[57] ABSTRACT

A DC motor control circuit for controlling the speed and direction of rotation including a plurality of linear amplifiers which are, respectively, connected to each of the stator windings of the DC motor and a pulse generator for generating rotational pulse trains which represent the rotational phases of the rotor of the DC motor and output impedance control pulse generator for generating based on the rotational pulse train control pulses which selectively control the linear amplifiers so as to produce nearly infinite output impedance and a motor control voltage and signal inverter for inverting the motor control voltage and a plurality of switching circuits connected to the inputs of the linear amplifiers for supplying the motor control voltage and phase inverter motor control voltage in a selective manner to each of the linear amplifiers and switching circuit control pulse generator for generating switching pulses based on the rotational pulse trains which are supplied to each of the switching circuits.

9 Claims, 14 Drawing Figures

DC MOTOR CONTROL CIRCUIT

CROSS-REFERENCES TO RELATED APPLICATIONS

This application is related to application Ser. No. 235,655 filed Feb. 18, 1981 entitled "A DC Motor" in which the inventor is Fumiyoshi Abe and which is assigned to the same assignee of the present application.

BACKGROUND OF THE INVENTION

1. Field of the Invention

This invention relates in general to DC motors and in particular to a novel DC motor control circuit.

2. Description of the Prior Art

FIG. 1 illustrates a conventional brushless DC motor drive circuit wherein reference characters L1, L2 and L3 designate stator windings of a brushless DC motor which are connected in Y connection and spaced 120° from each other.

A rotor Rt which is a permanent magnet is rotated inside of the windings L1, L2 and L3 and the rotational positions of the rotor Rt is detected by position detectors H1, H2 and H3 which are mounted around the rotor Rt 120° from each other.

The position detectors H1, H2 and H3 are Hall devices for example and produce position signals P1, P2 and P3 which are supplied to a drive pulse generator 1 which generates switching pulses which are supplied to output transistors Q1 through Q6 connected as shown. A motor drive voltage Vm is supplied to a power source terminal 2 and is sequentially applied to motor windings L1, L2 and L3 through the transistors Q1 through Q6 from drive pulse generator 1. FIG. 2A illustrates a set of positions signals P1, P2 and P3 which are generated by the Hall devices H1, H2 and H3, respectively. FIG. 2B illustrates the direction of the motor currents which flow through two of the three windings at any one time and as the rotor Rt rotates the conditions are switched to the next state as shown. As the rotor Rt rotates, reverse electromotive forces E1, E2 and E3 are generated in the stator windings as illustrated in FIG. 2D. FIGS. 2A through 2D illustrate wave forms for rotating the rotor Rt in the clockwise direction and if a direction control pulse is supplied at terminal 3 and when it changes the sequence of the switching pulses are changed on the transistors to cause the rotor Rt to rotate in the counterclockwise direction. If the brushless motor is installed in a video tape recorder, for example, as a reel drive motor, the brushless motor is required to be controlled from a speed of 100 rpm in the reverse direction to 100 rpm in the forward direction linearly. Thus, the tape speed control requires linear control of the motor drive torque as well as the motor braking torque.

In prior art driving circuits such as shown in FIG. 1, transistors $Q_1$ through $Q_6$ are considered to be diodes Dn and Dn+1 because the transistors $Q_1$ through $Q_6$ are unidirectional devices. The equivalent circuit of the driving circuit during driving operation is illustrated in FIG. 3A. An equivalent circuit during braking operation is illustrated in FIG. 3B. In these drawings, the resistance Rm represents the resistance of the windings and Im represents current flowing through the windings.

The driving torque of the motor is generated when the current Im flows in the opposite direction to the reverse electromotive voltage En. In this case, the relationship of the absolute value of Vm must be greater than the absolute value of En. On the other hand, a braking torque is generated when the current Im flows in the same direction to the reverse electromotive voltage En in case of reverse drive braking.

As is illustrated and is apparent from the equivalent circuit of FIG. 3B when the source voltage Vm is zero, the current Im flows through the windings corresponding to the reverse electromotive voltage En and a corresponding torque is generated which is proportional to the current Im and it is very difficult to control the torque of the motor in a linear fashion over a wide range.

So as to eliminate this problem, it is proposed to provide additional diodes D'n and D'n+1 as illustrated in FIG. 4 so as to establish a reverse current path. If the relationship Vm is less than En, the current flowing through the diodes D'n and D'n+1 could generate a regenerated braking torque.

In such a construction, a switching control between the reverse driving brake and the regenerated brake is required based on a rotational speed of the rotor Rt and such switching circuit is very critical in operation.

SUMMARY OF THE INVENTION

The present invention provides an improved control circuit for a DC motor wherein a plurality of linear amplifiers are respectively connected to each of the stator windings of the DC motor and a pulse generator generates a rotational pulse train which represents the rotational phases of the rotor of said DC motor. An output impedance control pulse generator generates control pulses which selectively control the linear amplifiers so as to give them almost infinite output impedance and a motor control voltage and signal inverter for inverting the motor control voltage are utilized with the plurality of switching circuits connected to each input circuit of the linear amplifiers for supplying the motor control voltage and phase inverted motor control voltage selectively to each of the linear amplifiers. A switching circuit control pulse generator generates switching pulses based on the rotational pulse train which are supplied to the switching circuit.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 5:
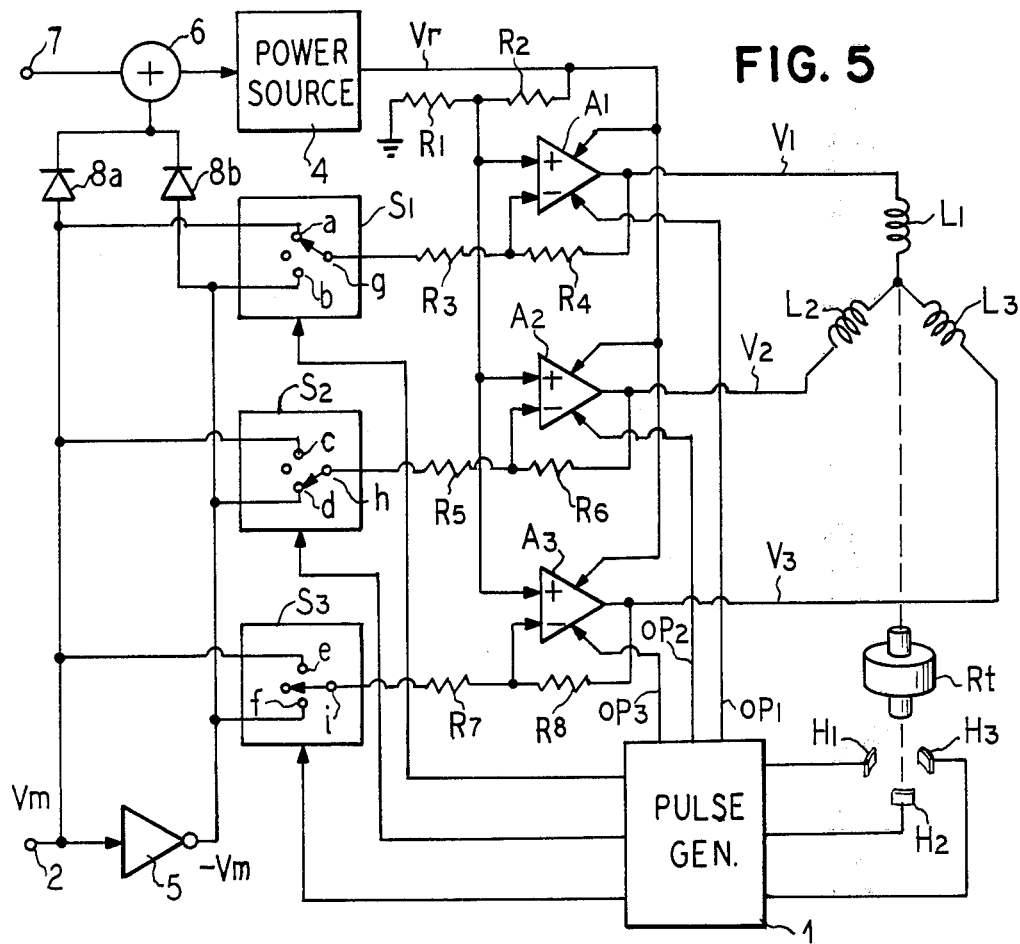
FIG. 5 illustrates an embodiment of the invention in schematic form.

FIG. 5 illustrates a preferred embodiment of a DC motor drive circuit of the present invention wherein a brushless DC motor has stator windings L1, L2 and L3, a rotor Rt and position detectors H1, H2 and H3 of the type described previously.

Three linear amplifiers A1, A2 and A3 provide outputs to the stator windings L1, L2 and L3 respectively as illustrated in the drawing.

A DC driving voltage Vr is supplied to the amplifiers A1, A2 and A3 from a power source circuit 4. The DC driving voltage Vr is divided into half values by resistors R1 and R2 which are connected between the output of the power source 4 and ground with the non-inverting inputs of the amplifiers A1, A2 and A3 connected to the junction point between these resistors as illustrated.

Input resistors R3, R5 and R7 have one side thereof connected to the inverting inputs of the amplifiers A1, A2 and A3 as illustrated in FIG. 5. The resistors R1, and R2 are selected to produce a value of Vr/2 at the outputs of the amplifiers A1, A2 and A3 when the voltage Vm=0.

The amplifiers A1 through A3 have control terminals for controlling the output impedance so that they will be at a very high value and control pulses OP1, OP2 and OP3 are respectively, supplied to the control terminals of the amplifiers A1 through A3 from a pulse generator 1.

The second sides of the input resistors R3, R5 and R7 are connected to switching circuits S1, S2 and S3 which comprise CMOS transistors, for example. As illustrated in FIG. 5, each of the switching circuits has one movable contact which selects one of the three fixed contacts. The movable contacts ghi are switched over in response to switching pulses from the pulse generator 1.

A motor control voltage Vm is supplied to an input terminal 2 and is supplied to fixed contacts a, c, e of the switching circuits S1, S2 an S3. The voltage Vm is also supplied to an inverter 5 for producing an inverted motor control voltage −Vm.

The, thus, generated voltage −Vm is supplied to fixed terminals b, d and f of the switching circuits S1, S2 and S3. The remaining fixed contact of each of the switching circuits is an open circuit as illustrated.

The power source circuit 4 is controlled by a control voltage from an adder 6 which receives an offset bias from a terminal 7 and also receives a pair of motor control voltages Vm and −Vm which are supplied through diodes 8a and 8b.

The power source circuit 4 constructed as described can supply a minimum operating voltage to the amplifiers A1 through A3 so as to reduce undesirable power dissipation.

Figure 6:
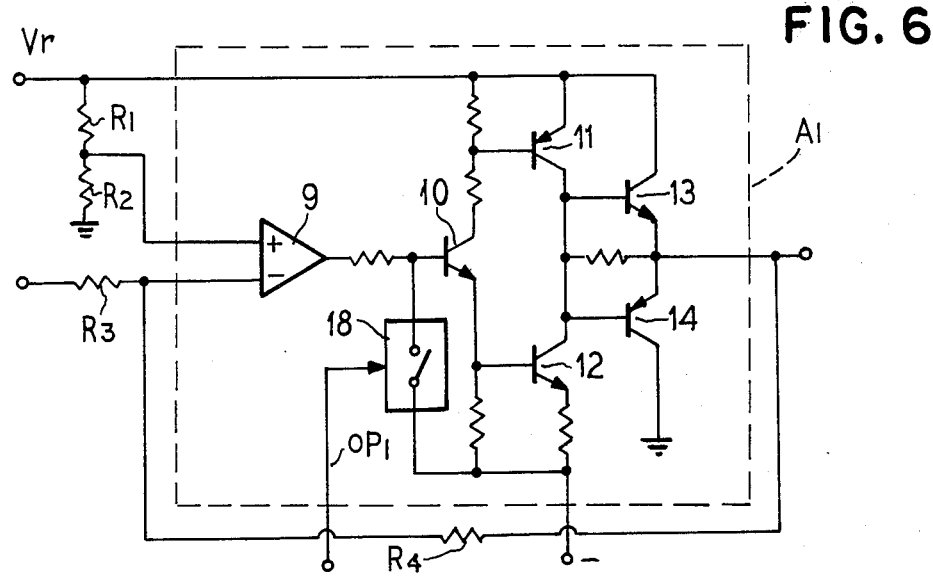
FIG. 6 illustrates an example of a linear amplifier of FIG. 5.

FIG. 6 illustrates an example of the linear amplifiers A1, A2 and A3 wherein an operational amplifier 9 having plus and negative inputs forms the input stage of the linear amplifier A. A base electrode of a transistor 10 is connected to the output of the operational amplifier 9. The emitter and collector electrodes of transistor 10 are connected to a PNP type driving transistor 11 and NPN type driving transistor 12 respectively as illustrated in FIG. 6. The junction point of the collectors of the transistors 11 and 12 is connected commonly to base electrodes of a NPN type output transistor 13 and a PNP type output transistor 14.

The emitter electrode of the drive transistor 11 and the collector electrode of the output transistor 13 are connected to the DC driving voltage Vr which is supplied from the power source circuit 4.

An electrical switch 18 is connected between a negative power source terminal 17 and the base electrode of the drive transistor 10 and the operation of switch 18 is controlled by the control pulse OP1 from the pulse generator 1.

In the amplifier A1 when the level of the control pulse OP1 is high, the switch 18 will be closed so that the output impedance will be very high as if it were an open circuit.

For this case, when the level of the control pulse is high the switching circuit S1 is controlled so that the movable contact g selects the open terminal due to control of the switching pulse from the pulse generator.

Figure 7A:
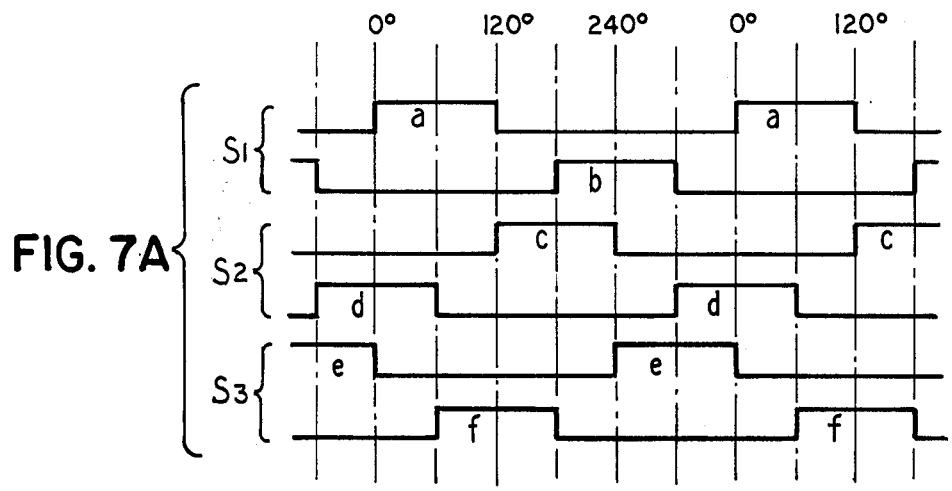
FIGS. 7A through 7C illustrate wave forms for explaining the invention.

The operation of the motor drive circuit of the invention will be explained with reference to FIG. 7. FIG. 7A illustrates the output signals obtained from the switching circuits S1, S2 and S3.

Thus, the switching circuit S1 selects the fixed terminal a during the rotational angle from zero to 120° of the rotor Rt and selects the fixed terminal b during the rotational angle of from 180° to 300°. At other times, the switch S1 selects the opened terminal between a and b.

Figure 7B:
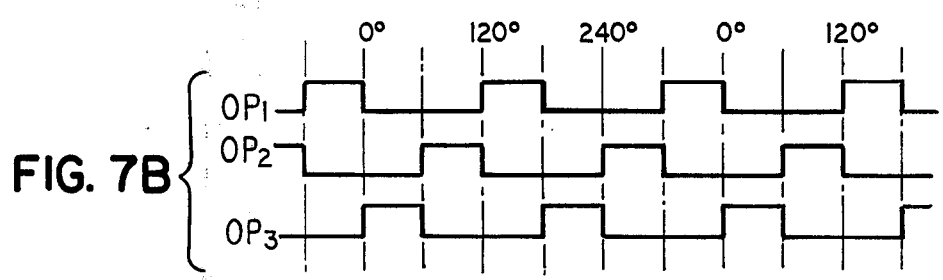

FIG. 7B illustrates a set of control pulses OP1, OP2, and OP3 which are supplied to the amplifiers A1, A2 and A3 respectively.

Figure 7C:
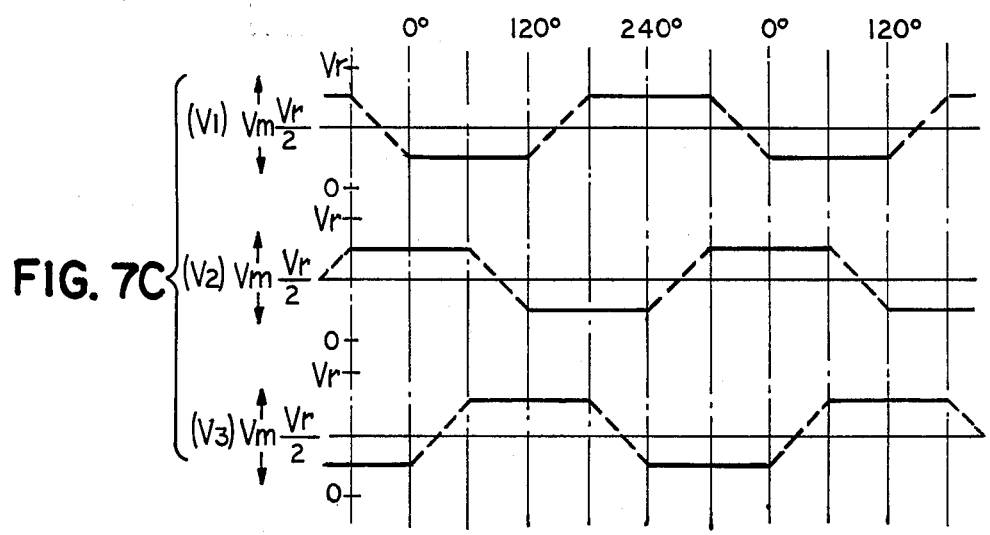

In the case when the rotor Rt is rotated in the clockwise direction terminal voltages V1, V2 and V3 are illustrated in FIG. 7C and are supplied to the stator windings L1, L2 and L3, respectively.

The polarities and amplitudes of these terminal voltages V1, V2 and V3 depend on the polarity and amplitude of the motor control voltage Vm.

Figure 1:
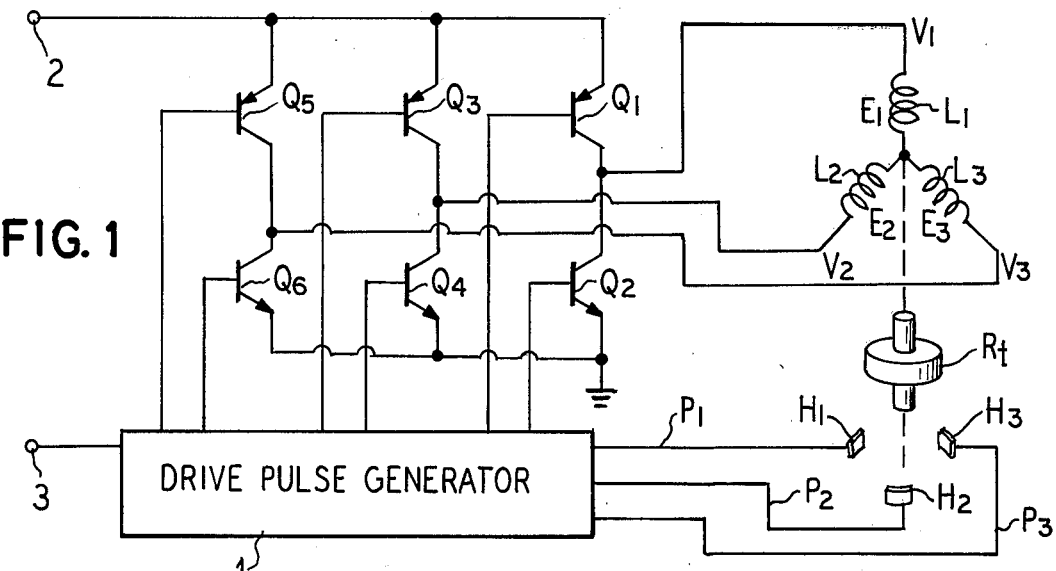
FIG. 1 illustrates a motor control circuit of the prior art.
Figure 2A:
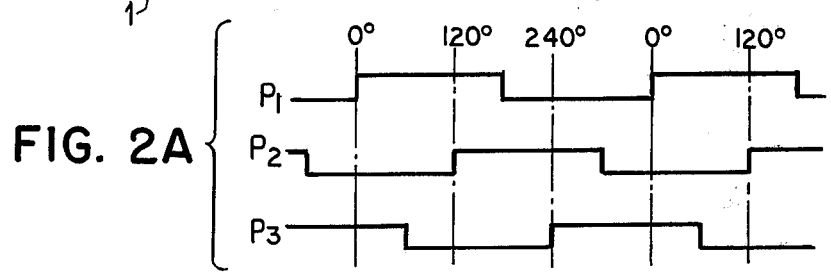
FIGS. 2A through 2D illustrate signals for explaining the circuit of FIG. 1.
Figure 2B:
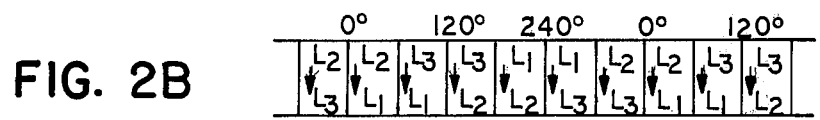
Figure 2C:
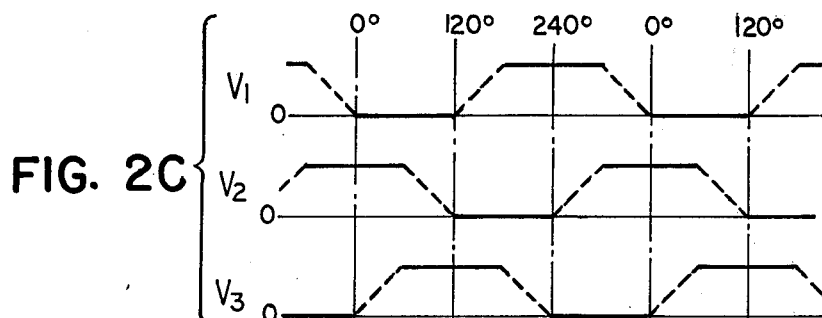
Figure 2D:
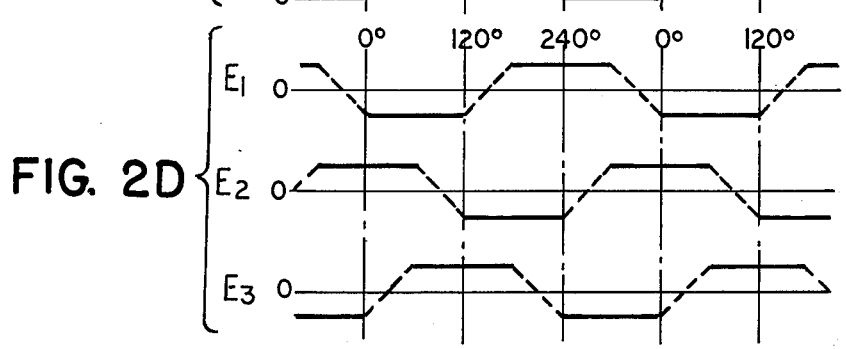
Figure 3A:
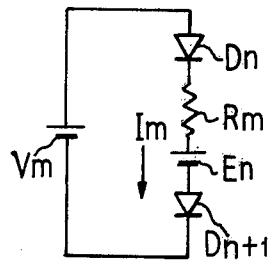
FIGS. 3A and 3B are schematic circuit diagrams for explaining the invention.
Figure 3B:
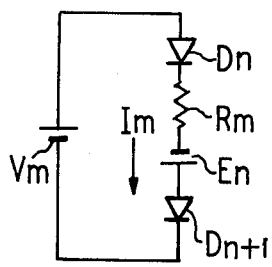
Figure 4:
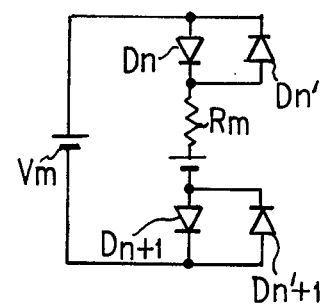
FIG. 4 illustrates a modification of the schematic diagram.
Figure 8:
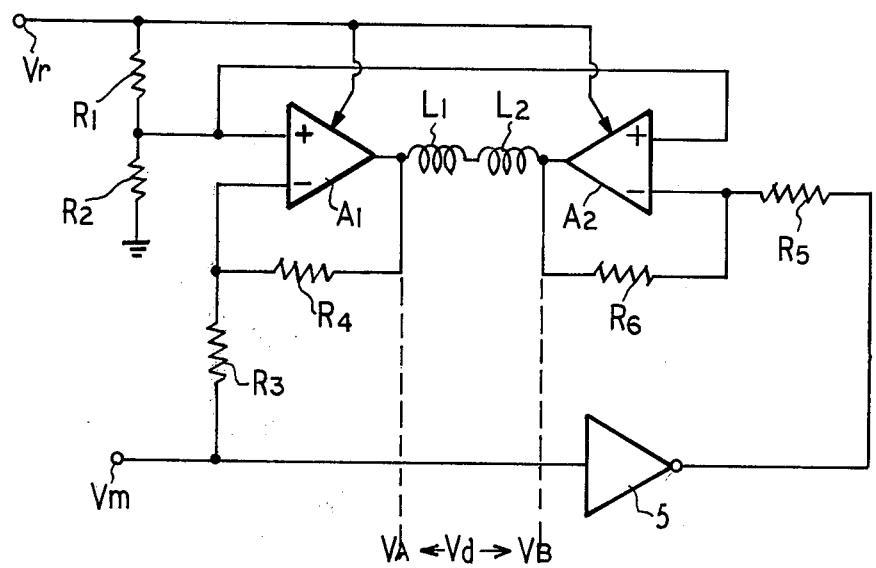
FIG. 8 illustrates the windings L1 and L2 connected in circuit with amplifiers A1 and A2.

As is apparent from FIGS. 7A through 7C, one of the linear amplifiers A1, A2 and A3 is always in the off state. For example, when the amplifier A3 is in the off state, the equivalent circuit becomes that where the stator windings L1 and L2 are interconnected between the linear amplifiers A1 and A2 as illustrated in FIG. 8.

At this time, the motor drive voltage Vd is equal to the absolute value of $V_A - V_B$ where $V_A = kVm + \frac{1}{2}Vr$ and $V_B = -kVm + \frac{1}{2}Vr$ which are supplied to the series connected motor windings L1 and L2. The reference character k is an amplification factor for the linear amplifiers A1 and A2.

The drive voltage Vd becomes 2kVm and the direction of the torque and the magnitude of the torque depend on the amplitude and polarity of the DC control voltage Vm and the control can be accomplished smoothly even near zero speed of the rotor Rt.

It is seen that this invention provides a new and novel DC motor control circuit and although it has been described with respect to preferred embodiments, it is not to be so limited as changes and modifications may be made therein which are within the full intended scope as defined by the appended claims.

We claim as our invention:

1. A DC motor control circuit for controlling the rotation of a DC motor comprising, a plurality of linear amplifiers, respectively connected to each stator windings of the DC motor, a pulse generator for generating rotational pulse trains which represent rotational phases of the rotor of said DC motor, an output impedance control pulse generator for generating in response to said rotational pulse train, control pulses for selectively controlling said plurality of linear amplifiers so they have almost infinite output impedances, a motor control voltage, a signal inverter for inverting said motor control voltage, a plurality of switching circuits respectively connected to the input circuits of said plurality of linear amplifiers for supplying said motor control voltage and said phase inverted motor control voltage selectively to each of said linear amplifiers, and a switching circuit control pulse gennerator, for generating, based on said rotational pulse train, switching pulses which are supplied to each of said switching circuits.

2. A DC motor control circuit as cited in claim 1, wherein each of said switching circuits has three selectable positions, one of which is supplied with said control voltage, the other of which is supplied with said phase inverted motor control voltage, and the other which is an open circuit.

3. A DC motor control circuit as cited in claim 1, further comprising a variable power source for supplying driving power and bias potential to said plurality of linear amplifiers proportional to said motor control voltage.

4. A DC motor control circuit as cited in claim 1, wherein said stator windings are star-connected and the free ends of said star-connected stator windings are connected to the output terminals of said linear amplifiers.

5. A control circuit for a reversible DC motor having a plurality of stator windings and a rotor, means for detecting the position of said rotor, a plurality of linear amplifiers with their outputs respectively connected to said plurality of stator windings, a pulse generator receiving the output of said detecting means and supplying inputs to said plurality of linear amplifiers, positive and negative sources of motor voltage, a plurality of switching means controlled by said pulse generator and connected to said positive and negative sources of motor voltage and said switching circuits supplying inputs to said plurality of linear amplifiers, and a power source supplying inputs to said plurality of linear amplfiers.

6. A control circuit according to claim 5 wherein said motor voltage is supplied to said power source.

7. A control circuit according to claim 6 wherein said means for detecting the position of said rotor comprises at least one Hall detector.

8. A control circuit according to claim 6 wherein said linear amplifiers comprises an operational amplifier which receives inputs from a switching means and said power source, second switching means receiving the input of said pulse generator, and transistor output means connected to said operational amplifier and to said stator windings, and to said second switching means.

9. A control circuit according to claim 6, including voltage dividing means connected to the output of said power source and supplying inputs to said plurality of linear amplifiers.

* * * * *